June 13, 1939.  W. W. LEDBETTER  2,162,281
PROCESS FOR TREATING CRUDE OIL
Filed July 8, 1936
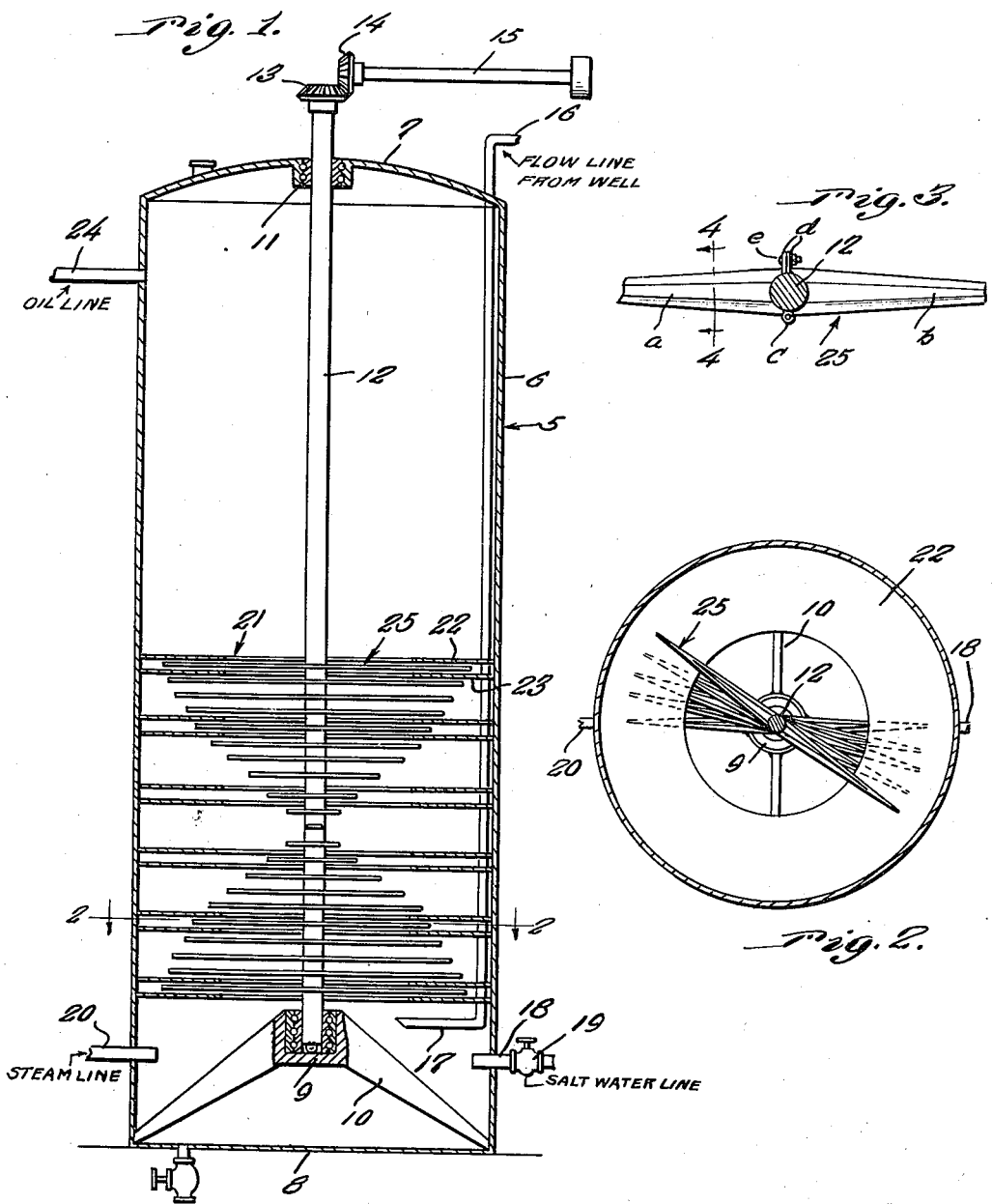
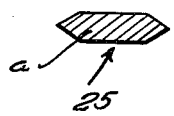
Inventor
W. W. Ledbetter
By Clarence A. O'Brien
Hyman Berman
Attorneys Patented June 13, 1939

2,162,281

UNITED STATES PATENT OFFICE 2,162,281

PROCESS FOR TREATING CRUDE OIL

Willie Walter Ledbetter, Gladewater, Tex., assignor to W. T. Olsen, Harris County, Tex.

Application July 8, 1936, Serial No. 89,679

1 Claim. (Cl. 196—3)

This invention appertains to new and useful improvements in an apparatus and also a process for the treatment of crude oil.

The principal object of the present invention is to cause the separation of oil from water and other substances through the principle of flotation wherein agitation is effected to cause a complete separation of the constituents of the crude oil.

Another important object of the invention is to provide an apparatus wherein steam and salt water are injected along with crude oil and the amalgamation agitated to the end that the valuable oil can be taken off with the least adherence of undesired properties.

These and various other important objects and advantages of the invention will become apparent to the reader of the following specification.

In the drawing:

Figure 1 represents a vertical sectional view through the separator.

Figure 2 is a horizontal section on the line 2—2 of Figure 1.

Figure 3 is a fragmentary horizontal sectional view through the shaft showing a preferable manner of securing the blades.

Figure 4 is a cross section of the blade taken substantially on the line 4—4 of Figure 3.

Referring to the drawing wherein like numerals designate like parts, it can be seen that numeral 5 generally refers to what is known in the industry as a "gun barrel" and this consists of the tank 6 having the top 7 and bottom 8. A bearing structure 9 is supported upon the bottom 8 by leg members 10, while in the top 7 is the bearing structure 11. The lower end of the vertical shaft 12 is supported in the bearing 9 and extends through the upper bearing 11 and is preferably equipped with a bevel gear 13 meshing with the bevel 14 of the drive shaft 15.

The flow line from the well is denoted by numeral 16 and extends through the top 7 and downwardly in the tank 6, at the bottom of which the pipe is disposed inwardly as at 17 and at this end is open so that oil can enter the lower portion of the tank.

Below the inlet 17 is the inlet end of the salt water pipe line 18 which may be equipped with a petcock 19. At the lower portion of the tank 6 is the inlet pipe 20 for the steam line and all of these pipe inlets are located below the blades and baffles generally referred to by numeral 21.

The baffles are arranged in pairs, the blades of each pair being denoted by reference characters 22—23. These pairs of baffles are vertically spaced in the tank 6 with the baffles in closely spaced relation. It is noted that these baffles are of annular formation having a substantially large central opening through which the oil can rise. Numeral 24 represents the outlet pipe adjacent the upper end of the tank for the recovered oil.

As can be seen in Figure 1, the blades generally referred to by numeral 25 are arranged in a downward spirally offset, this spiral of vertically spaced blades having the blades in vertically spaced relation, with certain of the blades operating in the baffles 22—23 and others between the pairs of baffles. It is preferable that the blades 25 each be divided into a pair of sections $a$—$b$ hingedly connected together as at $c$. (See Figure 3.) The opposed ends of these blades $a$—$b$ are grooved or notched so as to accommodate the shaft 12, with lugs $d$ provided on these sections with a bolt $e$ disposed therethrough so that the sections are clamped firmly against the shaft in alignment with each other.

Obviously in the operation of the apparatus, the crude oil is supplied through the pipe 16 to the bottom of the tank 6 where it mixes with the salt water and steam arriving through the pipes 18—20. This mixture serves to cause a flotation of the oil in the chamber and as the oil floats upwardly through the baffles, the blades 25 will break up the oil in such a manner as to liberate the oil from any water content or other constituent so that the commercially desired oil reaches the top of the tank and passes off through the pipe line 24.

While the foregoing specification sets forth the invention in specific terms, it is to be understood that numerous changes in the shape, size and materials may be resorted to without departing from the spirit and scope of the invention as claimed hereinafter.

Having thus described the invention what is claimed as new is:

The herein described method of separating oil from water comprising confining a column of salt water, introducing the oil into said column at the base thereof to rise therethrough and accumulate above said column, stirring the oil in said column as said oil rises to cause the same to be thrown outwardly toward the sides of the column, retarding the rise of oil in said column at the sides thereof, and withdrawing the accumulated oil above said column.

WILLIE WALTER LEDBETTER.